US012611645B2

(12) United States Patent
Bomsztyk et al.

(10) Patent No.: US 12,611,645 B2
(45) Date of Patent: Apr. 28, 2026

(54) MICROPLATE CYCLING THERMO SONICATOR WITH PROGRAMMABLE ULTRASOUND, HEATING, AND COOLING FOR MULTI-ANALYTICAL APPLICATIONS

(71) Applicants: Matchstick Technologies, Inc., Kirkland, WA (US); University of Washington, Seattle, WA (US)

(72) Inventors: Karol Bomsztyk, Mercer Island, WA (US); Gregory P. Darlington, Snohomish, WA (US); Daniel S. Mar, Seattle, WA (US); Thomas J. Matula, Kirkland, WA (US); Gregory T. Wing, Bellevue, WA (US)

(73) Assignees: Matchstick Technologies, Inc.; University of Washington

( * ) Notice: Subject to any disclaimer, the term of this patent is extended or adjusted under 35 U.S.C. 154(b) by 611 days.

(21) Appl. No.: 17/884,705

(22) Filed: Aug. 10, 2022

(65) Prior Publication Data

US 2023/0071935 A1 Mar. 9, 2023

Related U.S. Application Data

(60) Provisional application No. 63/236,964, filed on Aug. 25, 2021.

(51) Int. Cl.
*B01J 19/10* (2006.01)
*B01D 21/18* (2006.01)
(Continued)

(52) U.S. Cl.
CPC ............ *B01J 19/10* (2013.01); *B01D 21/283* (2013.01); *B01J 19/0093* (2013.01);
(Continued)

(58) Field of Classification Search
CPC ........... B01J 19/10; B01D 21/28; G01N 1/40
See application file for complete search history.

(56) References Cited

U.S. PATENT DOCUMENTS 3,949,349 A 4/1976 Massa et al.
5,510,257 A 4/1996 Sirkar et al.
(Continued)

FOREIGN PATENT DOCUMENTS

WO 2006014140 A1 2/2006
WO 2010118540 A1 10/2010
WO 2016011075 A1 1/2016

OTHER PUBLICATIONS

Matula et al., "MTLS 971: Sonochemical sample preparation for biological assays—A potential tool for sample processing," presentation at PacifiChem conference, Dec. 15-20, 2015, Honolulu, Hawaii, USA.

(Continued)

*Primary Examiner* — Clare M Perrin
(74) *Attorney, Agent, or Firm* — Clements Bernard Walker; Devin Cummins; Christopher L. Bernard

(57) ABSTRACT

A sonicator assembly, including: a microplate defining a plurality of wells; a manifold for containing a transducer fluid that is thermally coupled to the plurality of wells of the microplate; an ultrasonic generator operable for applying an ultrasonic excitation to the wells of the microplate; one or more of a heating module thermally coupled to and operable for selectively heating the transducer fluid and a cooling module thermally coupled to and operable for selectively cooling the transducer fluid; and a controller operable for controlling operation of the ultrasonic generator and the one or more of the heating module and the cooling module. The controller is further operable for monitoring a temperature and a pressure within the manifold. A temperature of the plurality of wells is controllable over a temperature range (Continued)

from 4° C. to 95° C. Optionally, the plurality of wells include a plurality of heat-resistant round-bottom hydrophilic wells.

17 Claims, 14 Drawing Sheets

(51) Int. Cl.

| | |
|---|---|
| *B01D 21/28* | (2006.01) |
| *B01J 19/00* | (2006.01) |
| *B01L 3/00* | (2006.01) |
| *B01L 7/00* | (2006.01) |
| *G01N 1/40* | (2006.01) |
| *B06B 1/06* | (2006.01) |

(52) U.S. Cl.
CPC ............. *B01L 3/50851* (2013.01); *B01L 7/52* (2013.01); *G01N 1/4077* (2013.01); *B01J 2219/00932* (2013.01); *B01L 2300/1827* (2013.01); *B01L 2300/185* (2013.01); *B01L 2300/1894* (2013.01); *B01L 2400/0439* (2013.01); *B06B 1/0622* (2013.01); *G01N 2001/4094* (2013.01)

(56) References Cited

U.S. PATENT DOCUMENTS

| | | | |
|---|---|---|---|
| 5,858,309 | A | 1/1999 | Mathus et al. |
| 6,436,351 | B1 | 8/2002 | Gubernator et al. |
| 6,699,711 | B1 | 3/2004 | Hahn et al. |
| 6,719,449 | B1 | 4/2004 | Laugharn et al. |
| 7,687,026 | B2 | 3/2010 | Laugharn, Jr. et al. |
| 7,951,337 | B2 | 5/2011 | Vollert |
| 8,127,614 | B2 | 3/2012 | Vivek et al. |
| 8,319,398 | B2 | 11/2012 | Vivek et al. |
| 2002/0141905 | A1 | 10/2002 | Sha et al. |
| 2004/0091910 | A1* | 5/2004 | Danenberg .......... C12N 15/1003 435/270 |
| 2005/0150830 | A1* | 7/2005 | Laugharn, Jr. .......... B01F 31/80 366/127 |
| 2006/0058707 | A1 | 3/2006 | Barthe et al. |
| 2006/0158956 | A1* | 7/2006 | Laugharn, Jr. .......... B01J 19/008 366/127 |
| 2009/0233814 | A1 | 9/2009 | Bashkirov et al. |
| 2010/0028988 | A1 | 2/2010 | Chu et al. |
| 2010/0289887 | A1 | 11/2010 | Charlot et al. |
| 2012/0107851 | A1* | 5/2012 | Killard ................. G01N 33/545 427/539 |
| 2012/0114089 | A1* | 5/2012 | Potyrailo ............. G01N 27/126 422/82.01 |
| 2015/0343493 | A1 | 12/2015 | Hajati et al. |
| 2016/0178500 | A1 | 6/2016 | Totoki |
| 2016/0339427 | A1 | 11/2016 | Wiktor |
| 2017/0205318 | A1 | 7/2017 | Matula et al. |
| 2018/0127738 | A1* | 5/2018 | Kilbank ................. A61K 35/28 |
| 2018/0209878 | A1* | 7/2018 | Matula ................. B06B 1/0622 |
| 2018/0374471 | A1 | 12/2018 | Dirksen et al. |
| 2020/0391210 | A1* | 12/2020 | Handique ........ G01N 33/56983 |

OTHER PUBLICATIONS

Dec. 23, 2022 International Search Report and Written Opinion issued in corresponding International Application No. PCT/US22/41234.

Jun. 25, 2025 Partial EP Search Report issued in corresponding EP Application No. 22861988.

* cited by examiner

MICROPLATE CYCLING THERMO SONICATOR WITH PROGRAMMABLE ULTRASOUND, HEATING, AND COOLING FOR MULTI-ANALYTICAL APPLICATIONS

CROSS-REFERENCE TO RELATED APPLICATION

The present disclosure claims the benefit of priority of U.S. Provisional Patent Application No. 63/236,964, filed on Aug. 25, 2021, and entitled "MICROPLATE CYCLING THERMO SONICATOR WITH PROGRAMMABLE ULTRASOUND, HEATING, AND COOLING FOR MULTI-ANALYTICAL APPLICATIONS," the contents of which are incorporated in full by reference herein.

STATEMENT REGARDING FEDERALLY SPONSORED RESEARCH

The present invention was made with U.S. Government support under Grant Nos. R42HG010855, U01CA246503, and R44GM122097 awarded by the National Institutes of Health. Accordingly, the U.S. Government has certain rights in the present invention.

TECHNICAL FIELD

The present disclosure relates generally to the field of sonicators. More particularly, the present disclosure relates to a microplate cycling thermos sonicator with programmable ultrasound, heating, and cooling for multi-analytical applications.

BACKGROUND

The statements in this section merely provide background information related to the present disclosure and may not constitute prior art.

Ultrasound is widely used in analytical and production applications in a process referred to as sonication. Many ultrasound workflows also include controlled heating/cooling steps either separately or at the same time as the application of sonic waves—but typically use test tubes and multiple sample transfers. By necessity, these traditional workflows are tedious and low-throughput because no currently-known instruments combine sonication in heat-resistant microplates with programmable heating/cooling profiles for high-throughput applications.

In sonication, acoustic energy agitates molecules in solution. Sonication is used widely in many analytical applications, including, but not limited to, the fragmentation of large molecules (DNA/RNA/chromatin), cell lysis, the synthesis of compounds (e.g. drugs and polymers), the extraction of molecules (e.g. DNA/RNA/chromatin/protein from formalin fixed paraffin embedded (FFPE) tissue blocks), the facilitation of DNA amplification (e.g. isothermal amplification), and the enhancement of enzymatic reactions.

Ultrasound generates heat, so cooling is provided to prevent the overheating of samples. And yet, in many of these analytical workflow protocols, one or more steps entail controlled sample heating before, after, or during sonication.

However, no currently known sonicators allow programmable heating of samples. Further, these analytical workflows typically use test tubes for sample transfers and, as such, may be tedious and low-throughput. On the contrary, high-throughput workflows typically use microplates.

In addition, biological and clinical samples need to be prepared before undergoing molecular analysis for research and diagnostics. The PIXUL high intensity focused ultrasound (HIFU) instrument developed by Matchstick Technologies uses 96-well round-bottom polystyrene plates (not heat-resistant) for high-throughput biological and clinical sample preparation. It will be appreciated that round-bottom 96-well plates increase HIFU efficiency in microplate wells as compared to flat or conical-bottom wells. However, an all-in-one microplate instrument with programmable ultrasound, heating, and cooling components for high-throughput analytical applications is still desired.

In addition, and as is known, clinical laboratories are obligated to hold on to FFPE blocks for years. As a result, FFPEs have become vast repositories of human tissues that provide a source for discovery of disease pathways, biomarkers, and drug targets. Further, given their biosafety and ease to transport and store, FFPEs have replaced frozen tissues for use in clinical settings for molecular diagnosis, such as genomic medicine, including precision oncology.

Workflows to retrieve analytes from FFPEs entail a heating step (such as around 95° C.) before sonication (e.g., Qiagen kits). This heating step requires that tubes or plates containing FFPE samples be made of heat-resistant plastic or other such materials. Further, to achieve consistent sonication across all 96 wells, currently-known plates have to be modified to render them hydrophilic.

SUMMARY

Disclosed embodiments include illustrative microplate sonicators with programmable ultrasound, heating, and cooling functions for multi-analytical applications.

In one illustrative embodiment, the present disclosure provides a sonicator assembly, including: a microplate defining a plurality of wells; a manifold for containing a transducer fluid that is thermally coupled to the plurality of wells of the microplate; an ultrasonic generator operable for applying an ultrasonic excitation to the wells of the microplate; one or more of a heating module thermally coupled to and operable for selectively heating the transducer fluid and a cooling module thermally coupled to and operable for selectively cooling the transducer fluid; and a controller operable for controlling operation of the ultrasonic generator and the one or more of the heating module and the cooling module. The manifold is adapted to thermally couple both a top surface and a bottom surface of the microplate to the transducer fluid. The controller is further operable for monitoring a temperature and a pressure within the manifold. A temperature of the plurality of wells is controllable over a temperature range from 4° C. to 95° C. Optionally, the plurality of wells include a plurality of heat-resistant round-bottom hydrophilic wells.

In another illustrative embodiment, the present disclosure provides a sonicator method, including: providing a microplate defining a plurality of wells; providing a manifold for containing a transducer fluid that is thermally coupled to the plurality of wells of the microplate; selectively applying an ultrasonic excitation to the wells of the microplate using an ultrasonic generator; one or more of selectively heating the transducer fluid using a heating module thermally coupled to the transducer fluid and selectively cooling the transducer fluid using a cooling module thermally coupled to the transducer fluid; and controlling operation of the ultrasonic generator and the one or more of the heating module and the cooling module using a controller. The manifold is adapted to thermally couple both a top surface and a bottom surface of the microplate to the transducer fluid. The sonicator method further includes monitoring a temperature and a pressure within the manifold using the controller. The sonicator method further includes controlling a temperature of the plurality of wells over a temperature range from 4° C. to 95° C. Optionally, the plurality of wells include a plurality of heat-resistant round-bottom hydrophilic wells.

Further features, advantages, and areas of applicability of the concepts and principles of the present disclosure will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the concepts and principles of the disclosed embodiments. In the drawings.

DETAILED DESCRIPTION

The following description is merely illustrative in nature and is not intended to limit the present disclosure, application, or uses in any manner.

As will be discussed in further detail below, disclosed embodiments include illustrative microplate sonicators with programmable ultrasound, heating, and cooling functions for multi-analytical applications.

Given by way of overview, various embodiments include a high intensity focused ultrasound (HIFU) microplate device for high-throughput sample sonication in 96-well round-bottom plates with programmable heating/cooling functionality in heat-resistant round-bottom 96-well plates that require no sample transfers. In various embodiments, the plates have been rendered hydrophilic, thereby helping to achieve consistent sonication across all 96 wells. Various embodiments may include a HIFU sonicator and polymerase chain reaction (PCR)-like cycler combined in one 96-well microplate instrument. In some such embodiments a sonicator instrument with programmable temperature control in the 4-95° C. range uses heat-resistant round bottom 96-well plates to retrieve chromatin/DNA/RNA/protein from FFPE tissue blocks. Some such embodiments can help contribute to lessening the labor intensity of and speeding up slow sonication-heating-cooling in currently-known research and diagnostic analytical protocols.

Still by way of overview, it will be appreciated that various embodiments can help allow programming of temperature in 96-well-microplate wells over the range of 4-95° C. and sonication in a single device and without transferring samples from test tubes or between plates. It will further be appreciated that some such embodiments may have application in high-throughput, multi-analytical applications, such as those shown in Table 1 below. For example and as shown in Table 1 below, in various embodiments illustrative methods may be provided for enhancing biochemical and chemical reactions (including enzymatic catalysis and antibody-antigen binding) in heat-resistant microplates through application of cycles of controlling heating/cooling and sonication either at the same time or at different times.

TABLE 1

| Examples of workflows that use both sonication and adjustable temperature (4°-95° C.) | |
| --- | --- |
| Protocol | Applications |
| DNA/RNA/ chromatin shearing | Genomics, Epigenetics, Transcriptomics |
| FFPE retrieval of chromatin/DNA/ RNA/protein | Genomics, Epigenetics, Transcriptomics, Proteomics |
| Proteinase K digestion | Genomics, Epigenetics, Transcriptomics |
| Trypsin digestion- proteomics | Proteomics |
| Isothermal DNA amplification | Genomics, Epigenetics, Transcriptomics |
| Synthesis | Drugs and other compounds |

Figure 1:
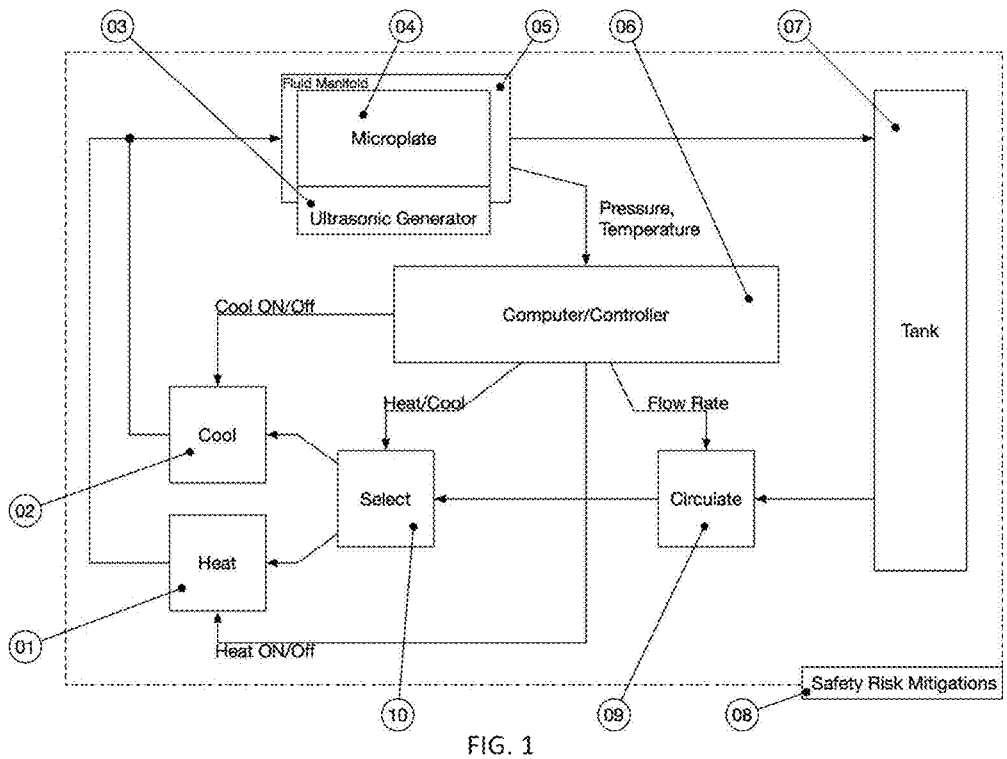
FIG. 1 is a high-level block diagram of an illustrative microplate cycling thermo sonicator of the present disclosure.

Referring now to FIG. 1, in one embodiment, an illustrative microplate cycling thermo sonicator incorporates programmable heating and programmable cooling functions for controlling the temperature of microplate wells. In various embodiments, the microplate cycling thermo sonicator sonicates the microplate wells and controls the microplate well temperature over a range of 4° C. to 95° C. Because liquid transducer fluid is used to couple acoustic energy to the microplate wells, the transducer fluid is also chilled and/or heated as a means to control the temperature of the microplate wells. An ultrasonic generator 03 applies High Intensity Focused Ultrasound (HIFU) to a microplate 04. A suitable ultrasonic generator is described in U.S. Pat. No. 10,809,166, the entire contents of which are hereby incorporated by reference. It will be readily apparent to those of ordinary skill in the art that other ultrasonic generators may be used as well.

In various embodiments, the transducer fluid is circulated with a fixed displacement pump 09 through a heating path or a cooling path, under the microplate 04, and back to a tank 07. The heated transducer fluid is also circulated above the microplate to avoid condensation provide uniform heating within the wells. The pressure drop is minimized between the microplate 04 and the tank 07, thereby minimizing the pressure under the microplate 04, as the transducer fluid in the tank 07 is exposed to atmosphere at 0 psig.

In various embodiments, a computer 06 monitors the temperature and pressure of the fluid under the microplate 04. The computer 06 also controls temperature of the transducer fluid, by selecting the heating path or the cooling path via a solenoid valve 10, and activating/controlling a corresponding heating module 01 or a corresponding cooling module 02. In various embodiments the cooling module 02 may include a Peltier (thermoelectric) device and can cool the fluid to below 4° C. In various embodiments the heating module 01 may include an in-line heating core that includes resistive heating elements and can be programmed to control the transducer fluid temperature in contact with the microplate 04 to above 95° C. Therefore, in various embodiments, the temperature of the microplate 04 can be controlled to any temperature within the range of 4° C. to 95° C. It will be appreciated that, in various embodiments, the entire fluid path, including the tank 07, may be at an elevated temperature. As such, in various embodiments, safety risk mitigations 08 are implemented to help contribute to providing for safety of a user and bystanders.

Figure 2:
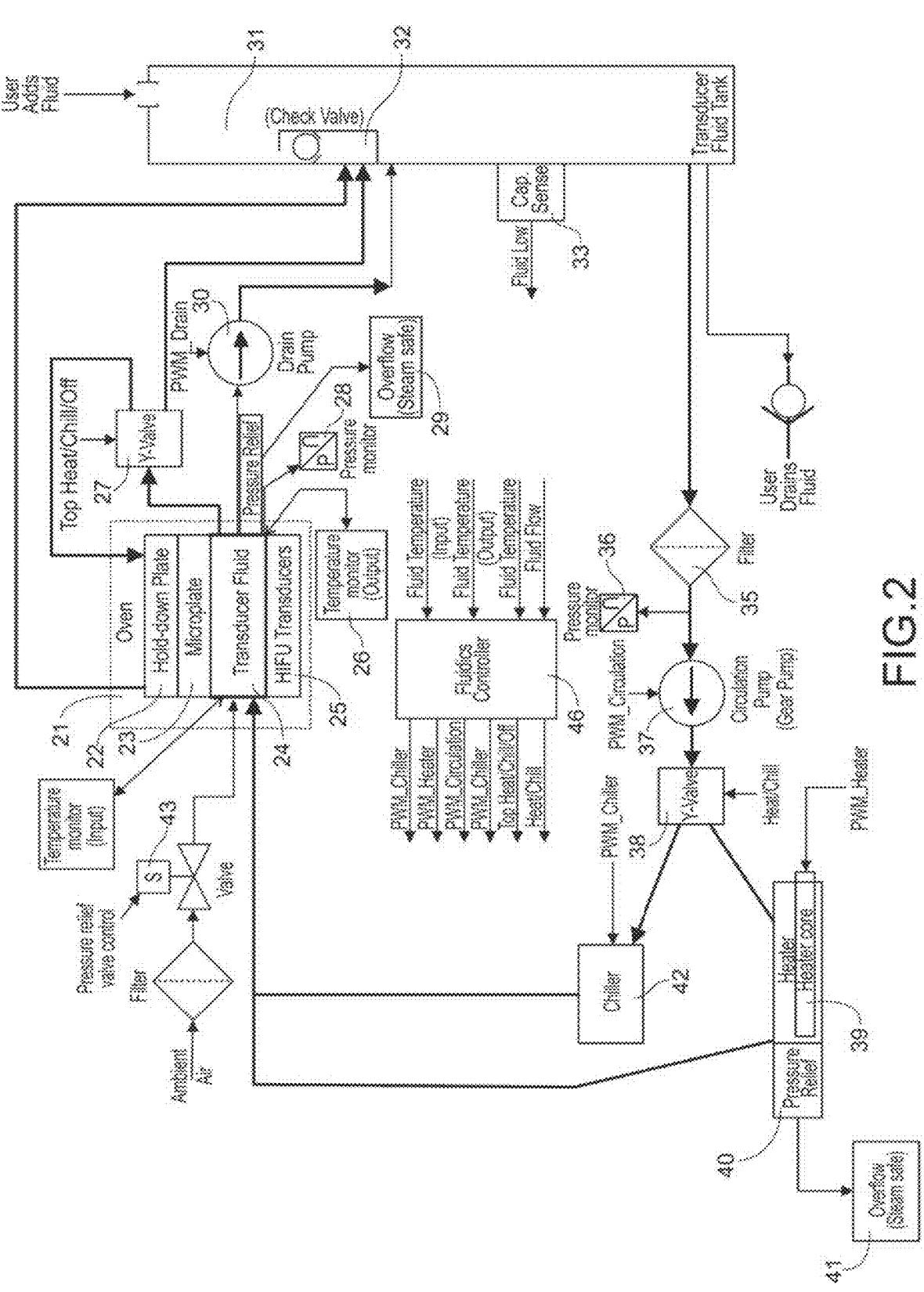
FIG. 2 is a detailed block diagram of the microplate cycling thermo sonicator of FIG. 1.

Referring additionally to FIG. 2, a non-limiting implementation of an illustrative microplate cycling thermo sonicator is explained by way of illustration only and not of limitation. As will be discussed below, the illustrative microplate cycling thermo sonicator implements, among other functions and without limitation, sonication, heating, cooling, control, monitoring, and safety risk mitigation.

In various embodiments a microplate 23 is enclosed in an oven 21, with heat applied from both below and above. Heating from below is accomplished by heating transducer fluid 24 which is coupled to lower portions of wells of the microplate 23. A rigid hold-down plate 22 is in contact with the top of the microplate 23 to prevent the microplate 23 from warping under pressure. The hold-down plate 22 is used for heating the upper surface of the enclosed wells of the microplate 23. Heating the upper surface of the wells of the microplate 23 prevents fluid inside the wells of the microplate 23 from condensing on the upper surface of the wells of the microplate 23. In various embodiments, the hold-down plate 22 is heated by circulating the heated transducer fluid 24 through the hold-down plate 22. In other embodiments, resistive heating elements embedded within the hold-down plate 22, combined with closed loop control, heat the hold-down plate 22 and thereby maintain temperature of the oven 21 and temperature of the microplate 23.

In various embodiments circulation of the transducer fluid 24 starts with a user filling a tank 31 with transducer fluid 24. A fluidics controller 46 enables and controls a fluid pump 37, thereby drawing fluid from the tank 31.

In various embodiments, in chill mode, a chiller 42 is selected via a Y-valve 38. The chiller 42 is controlled to the set temperature by the controller 46 by monitoring the output temperature by a temperature monitor 26.

In various embodiments, in heat mode, a heater 39 is selected via the Y-valve 38. A pressure relief valve 40 will open if the heated fluid vaporizes. The vented vapor is safely purged into an overflow tank/diffuser 41.

In various embodiments, the transducer fluid 24 flows in one end of the manifold that surrounds the microplate and flows out the opposite end. If sonication is applied with the transducer fluid 24 in a heated state, then the transducer fluid 24 may vaporize under the microplate 23 and may result in overpressure under the microplate 23. In case of overpressure under the microplate 23, the pressure relief valve 28 will open, thereby relieving pressure from under the microplate 23 and venting the fluid and/or vapor safely into an overflow tank/diffuser 29. In heat mode, and when the transducer fluid 24 is used to heat the hold-down plate 22, the controller 46 selects a Y-valve 27 to circulate the transducer fluid 24 through the hold-down plate 22, thereby heating the hold-down plate 22 and the microplate 23 to a temperature sufficiently close (for example, within 4 degrees or so) to the lower portion of the microplate 23. The transducer fluid 24 returns to the tank 31 though a check valve 32.

In various embodiments, the check valve 32 allows the controller 46 to determine whether the microplate 23 is installed by turning off the fluid pump 37 and turning on a pump 30, then monitoring pressure with a pressure sensor 28 operatively coupled under the microplate 23. If a microplate 23 is installed, then the pressure will be less than a threshold amount, such as, for example and without limitation, around −0.5 psig. The ambient pressure is determined by opening a valve 43 with the fluid pump 37 off and the pump 30 on until pressure stabilizes, thereby indicating that air has bypassed the path of the transducer fluid 24, then closing the valve 43 and reading a negative pressure at the pressure sensor 28 to determine that the microplate 23 is installed. If the microplate 23 is not installed, then the pressure sensed with the valve 43 closed and the pump 30 on will not be negative when compared to the steady state pressure with the valve 43 open and pump 30 on.

In various embodiments, pressure is monitored by a pressure sensor 36 to determine whether a filter 35 is to be replaced. As the filter 35 becomes occluded, the pressure sensed by the pressure sensor 36 decreases further. When the pressure sensed by the pressure sensor 36 drops below a threshold level, such as around −3 psig or so, the user is informed that the filter should be changed. Given by way of non-limiting example, a typical pressure for an unobstructed filter is around −0.5 psig.

In various embodiments, a capacitance sensor 33 detects level of the transducer fluid 24. If the capacitance sensor 33 detects that level of the transducer fluid 24 is low, then the user is notified to add additional transducer fluid 24 to the tank 31.

In various embodiments, sonication is achieved with High Intensity Focused Ultrasound (HIFU). It will be appreciated that, in other embodiments, sonication may be achieved with unfocused high amplitude ultrasound, defocused or multi-foci high amplitude ultrasound, medium or low-amplitude focused ultrasound, or the like. One example of defocused ultrasound is where the center of curvature of a mechanically focused transducer varies continuously across the transducer face, thereby creating a circular focal pattern. An example of a multi-foci transducer is where the transducer is divided into two or more discrete sectors, with each sector focused to a location separate from the other transducer sectors.

It will be appreciated that, in various embodiments, HIFU can be applied over the full temperature range. It will be appreciated that, for most current commonly used workflows, sonication and heating are applied separately. However, in some applications sonication and heating of samples may be applied simultaneously to enhance protocols—such as, for example, in enzymatic reactions or isothermal and PCR DNA amplification.

It will be appreciated that rate of heating and cooling of samples can also be important in some workflows, as in PCR workflows. For examples, in various embodiments, illustrative microplate cycling thermo sonicators can help provide an ability to program HIFU and temperature to optimize high throughput protocols. As such, it will be appreciated that, in such embodiments, illustrative microplate cycling thermo sonicators can be considered not only a HIFU sonicator, but also a PCR cycler in one instrument.

Figure 3A:
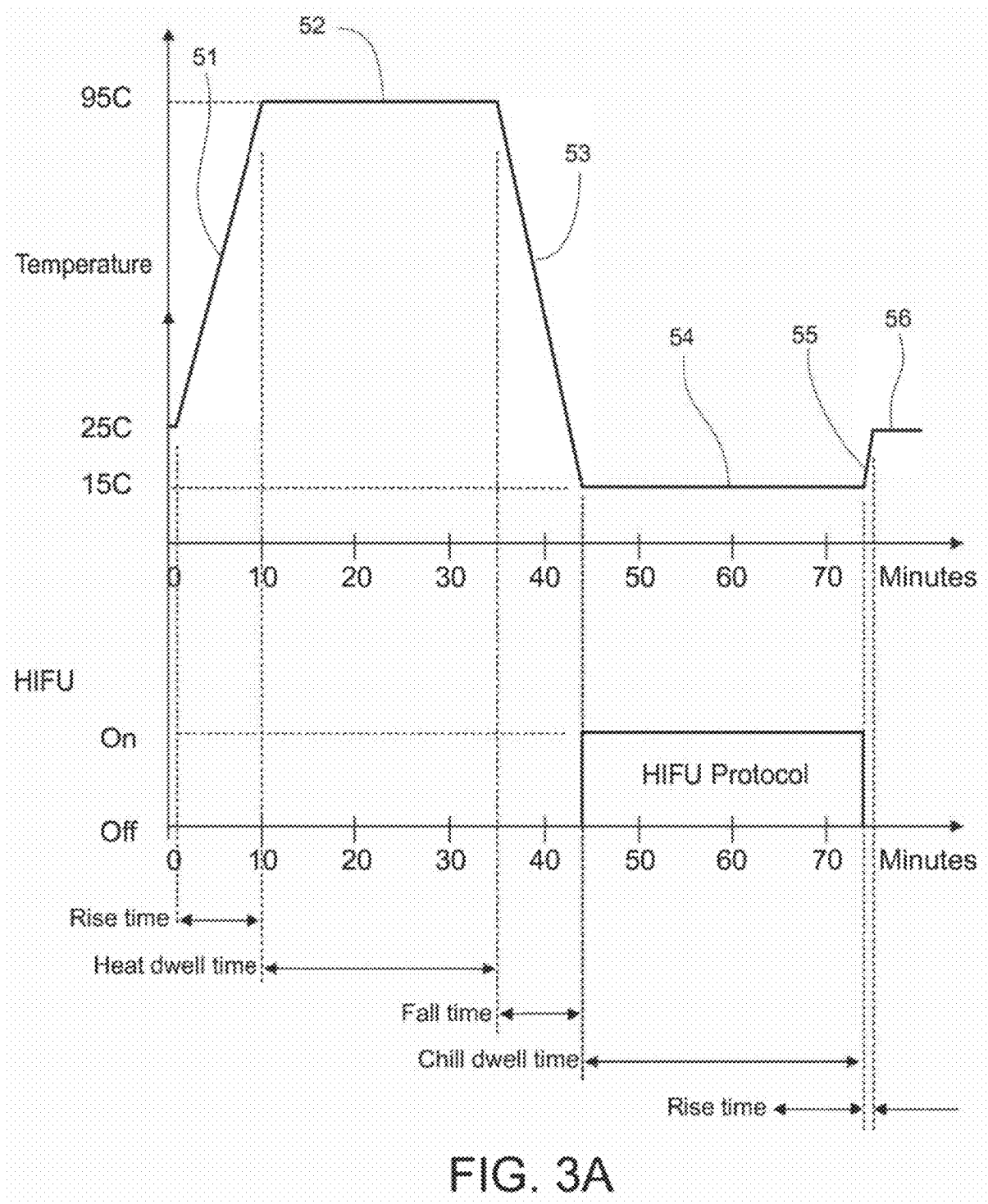
FIG. 3A is an illustrative temperature profile with high intensity focused ultrasound sonication.

Referring additionally to FIG. 3A, various embodiments can help provide a user with controls to set temperature profiles of the transducer fluid 24. In various embodiments, a user can set rise time, which is the time lapse between an initial temperature of the microplate 23 and a next temperature 52 of the microplate 23 (which are 25° C. and 95° C., respectively, in the non-limiting example). The user can also independently set other rise and fall times during a profile. For example, a fall time and a second rise time are shown in FIG. 3A. As another example, the user can set slope (that is, rate of change) of a transition (rise) 51 between the initial temperature of the microplate 23 and the next temperature 52 of the microplate 23. It will be appreciated that the slope can be set to a different value for all temperature transitions of the microplate 23, although various embodiments permit the user to set default values for the three primary transitions as shown in FIG. 3A: the rise 51 transition to the heat mode and the next temperature 52, a fall 53 transition to a lower temperature 54, and a rise transition 55 to ambient temperature 56. Although not shown in FIG. 3A, in various embodiments the user can also set the default slope for the falling transition when returning to ambient temperature 56 at the end of a heat cycle.

Figure 3B:
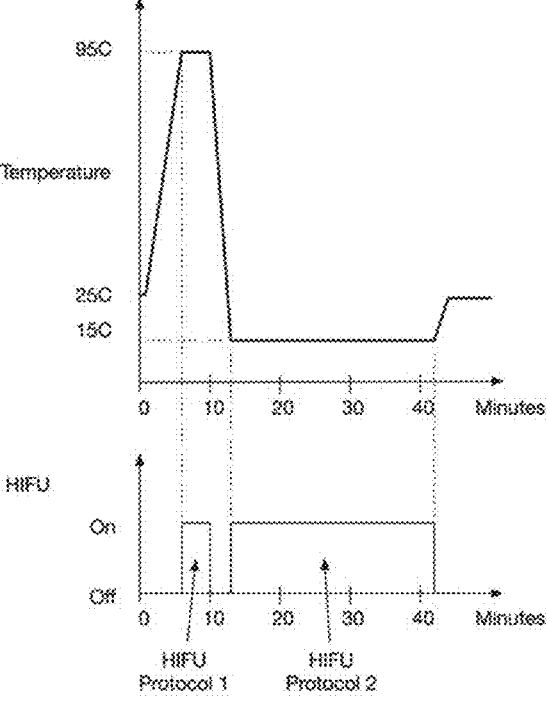
FIG. 3B is another illustrative temperature profile with high intensity focused ultrasound sonication.
Figure 3C:
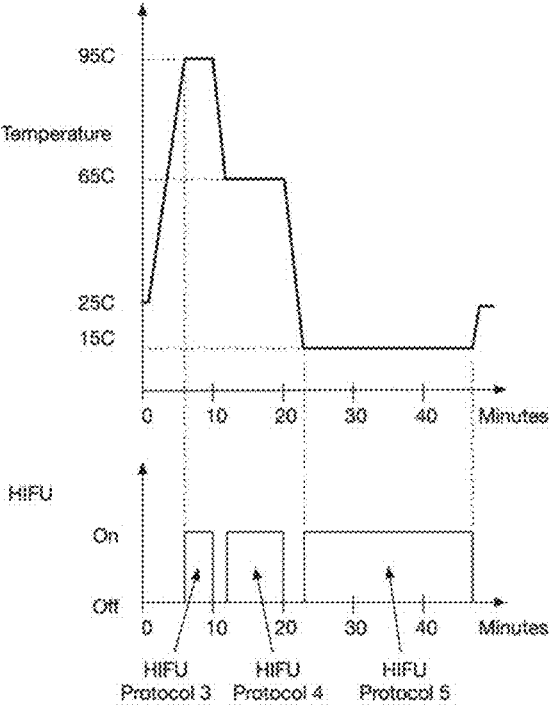
FIG. 3C is another illustrative temperature profile with high intensity focused ultrasound sonication.

Referring additionally to FIGS. 3B and 3C, in addition to rise and fall times, in various embodiments, the user can also set dwell times for the heat cycle and the chill cycle. In various embodiments, the chill cycle defaults to be equal to the ultrasound processing time, during which time the HIFU protocol is active. As shown in different temperature profiles of the microplate 23 in FIGS. 3B and 3C, HIFU may be applied at an elevated temperature (HIFU Protocol 1 in FIG. 3B) and at a reduced temperature (HIFU Protocol 2 in FIG. 3C).

Although FIG. 3B shows only two applications of HIFU (HIFU Protocol 1 and HIFU Protocol 2), it will be appreciated that various embodiments can apply multiple HIFU protocols at multiple and varying temperatures. For example and as shown in FIG. 3C, two high temperature HIFU Protocols may be applied: HIFU Protocol 3 at a first set temperature of the microplate 23 and HIFU Protocol 4 at a second set temperature of the microplate 23. It will also be appreciated that various embodiments can help provide the user with means to set a HIFU Protocol active during a temperature transition, such as, without limitation, adding a HIFU Protocol during a transition between HIFU Protocol 3 and HIFU Protocol 4.

Figure 4A:
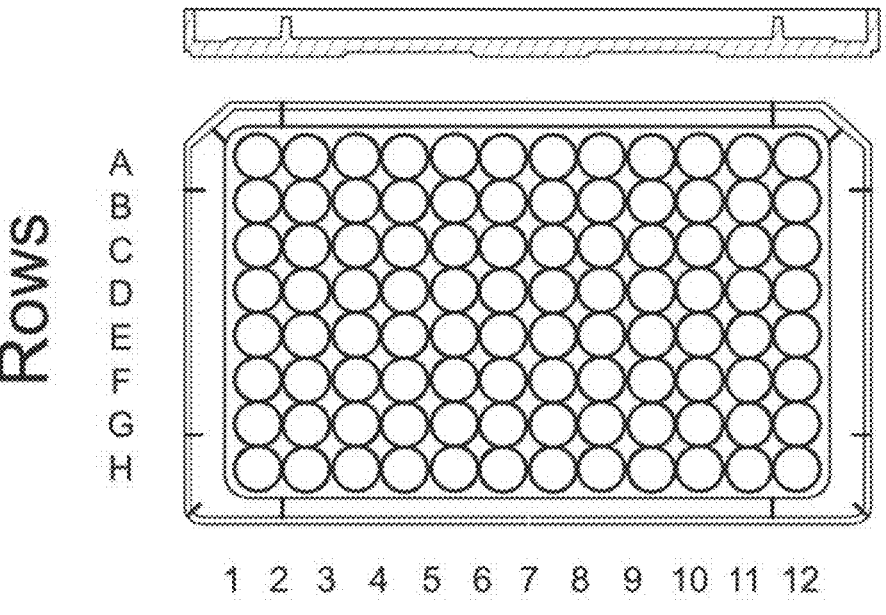
FIG. 4A is a plan view of an illustrative 96-well plate utilized in conjunction with the microplate cycling thermos sonicator of the present disclosure.
Figure 4B:
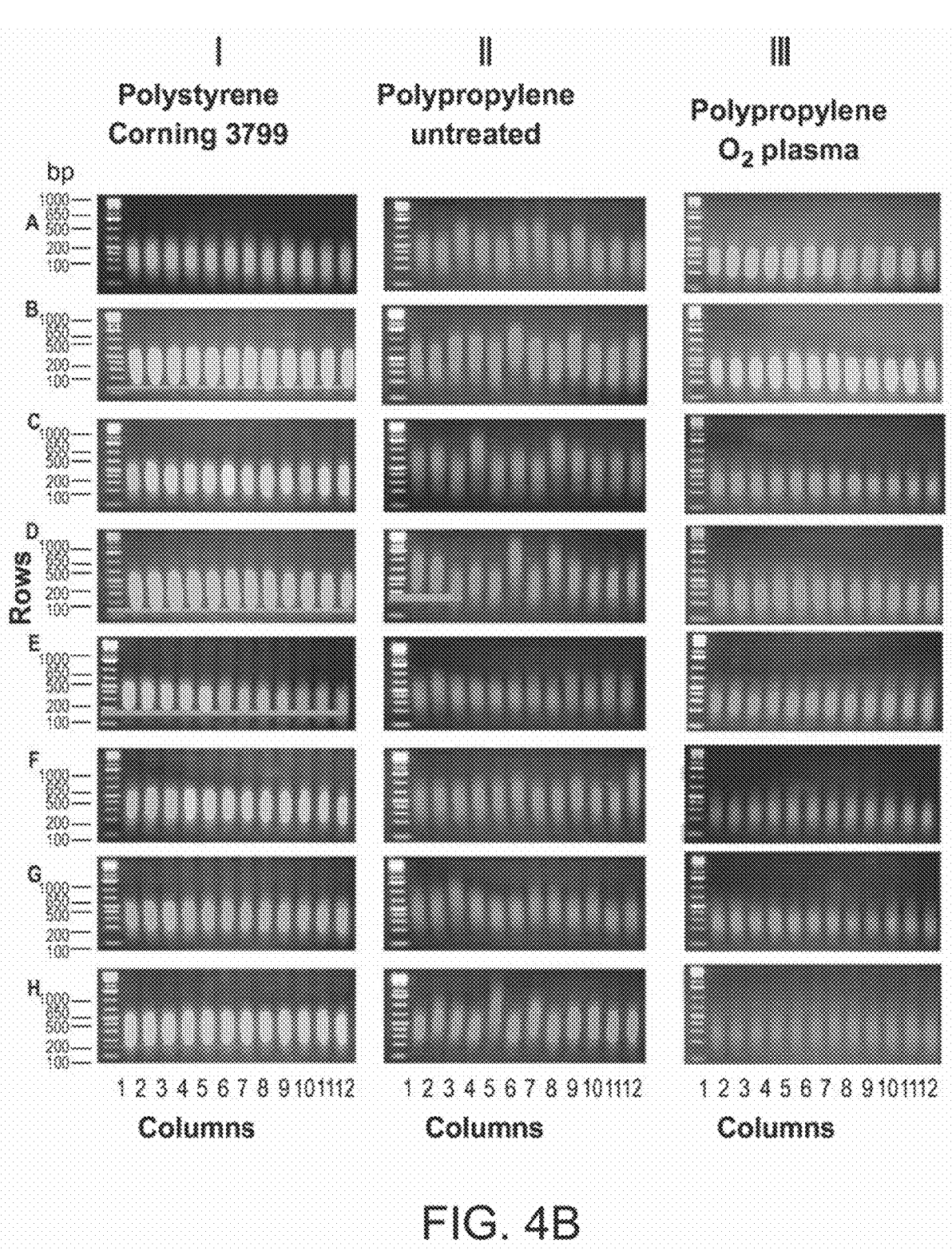
FIG. 4B is an illustration of the shearing of DNA using the 96-well plate of FIG. 4A.
Figure 4C:
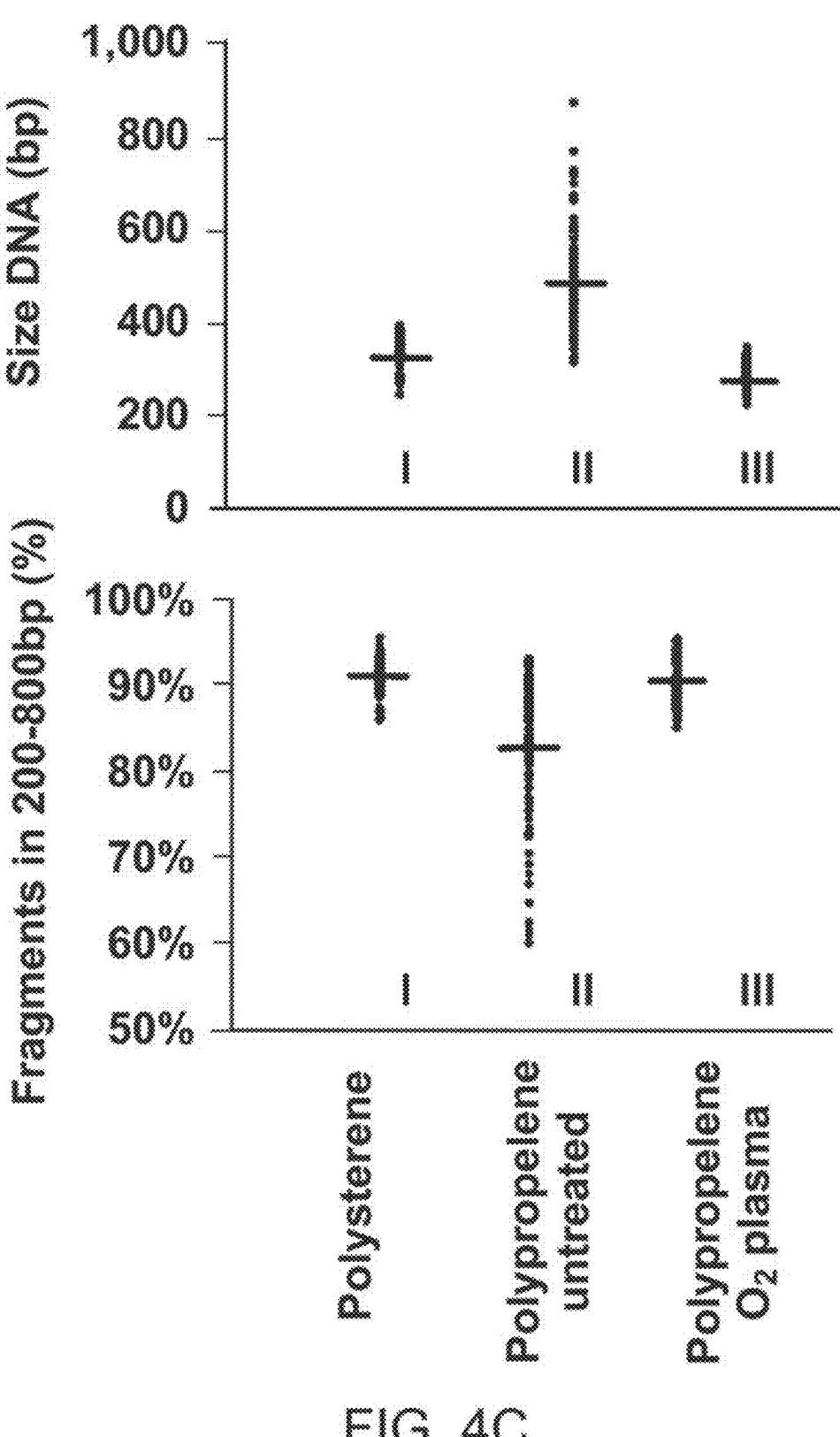
FIG. 4C illustrates graphical representations of sheared DNA fragments and fragment distributions.

Referring additionally to FIGS. 4A-4C, in various embodiments, currently-known heat-resistant round bottom 96-well microplates have been modified to achieve consistent DNA shearing across all 96 wells. For example, DNA was sheared in polystyrene 96-well plates (FIG. 4A), untreated polypropylene 96-well plates (FIG. 4B), and treated polypropylene 96-well plates (FIG. 4C).

As shown in FIG. 4A, in various embodiments, shearing was performed using 96-well plates (with each well containing salmon DNA at 100 ng/µl in 100 µl volume/well) for a total treatment time of 30 min per each plate.

As shown in FIG. 4B, column I is a polystyrene Corning 3799 plate, column II is an untreated polypropylene plate Corning 3365, and column III is a polypropylene Corning 3365 $O_2$ radio frequency (RF) plasma treated plate. Sheared DNA from all 96 wells of each plate was analyzed by agarose gel electrophoresis and visualized by ethidium bromide. A DNA ladder was run in the first lane of each gel. Sheared fragments were analyzed by agarose gel electrophoresis image in-house software as previously described.

As shown in FIG. 4C, a graphical representation of sheared DNA fragment (top) and fragment distribution (bottom) is shown for each plate. All 96-well samples are plotted. Each horizontal bar corresponds to mean values.

It will be appreciated that 96-well round-bottom polystyrene plates that yield consistent DNA/chromatin shearing in various embodiments are those that are modified for use in tissue. For example, some polystyrene plates' melting point may be too low (softening point ~90° C.) for use in procedures that entail heat retrieval of analytes (temperature ~95° C.). It will be appreciated that polypropylene plates may be more heat-resistant with a melting point ~170° C. but those that are commercially available may not generate consistent DNA shearing. To that end and accordingly, radio frequency plasma treatment was used to modify various currently-known round-bottom polypropylene plates to achieve consistent shearing across all 96-wells comparable to that of currently-known polystyrene plates.

Figure 5A:
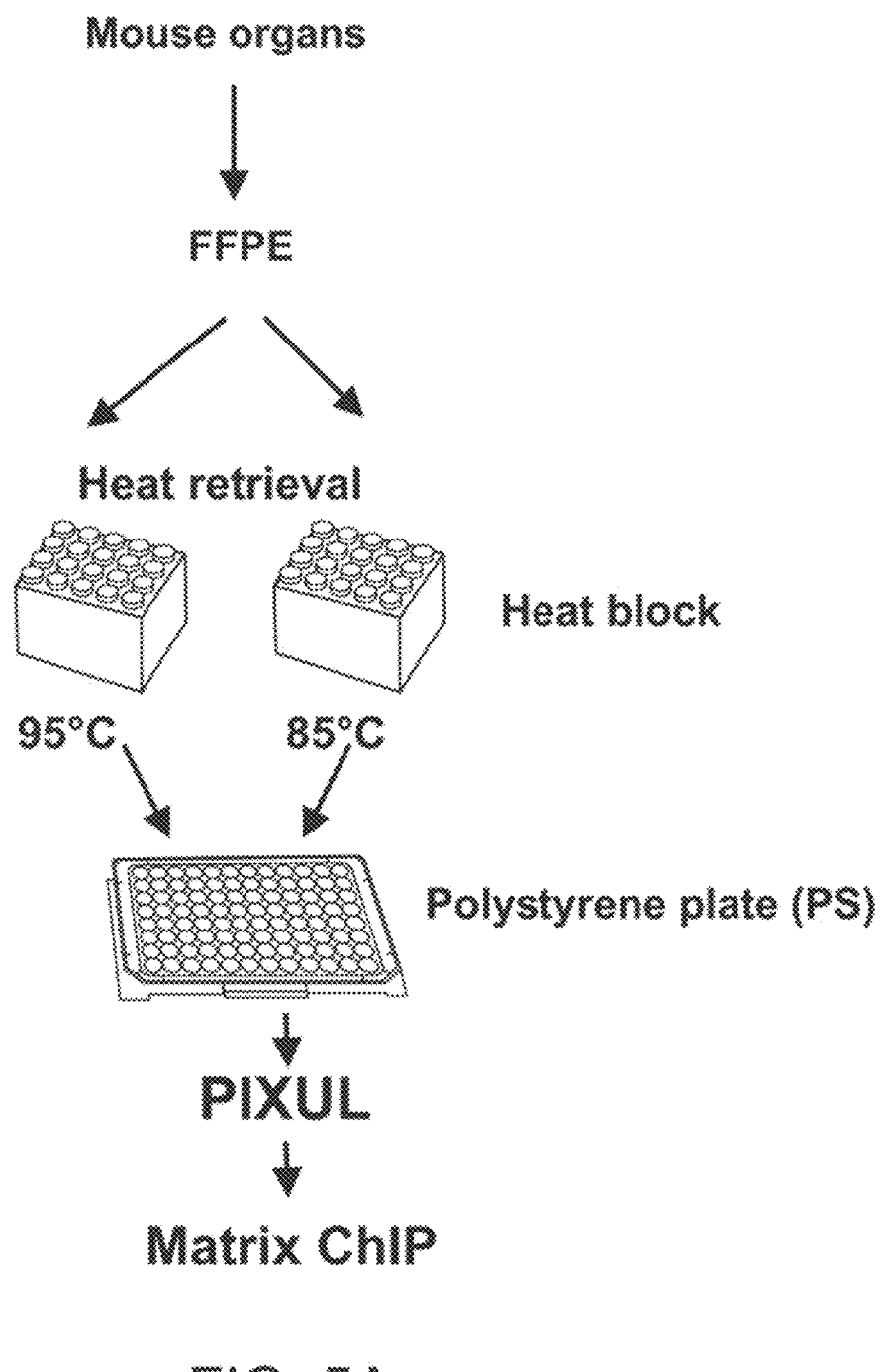
FIG. 5A illustrates an illustrative FFPE protocol.
Figure 5B:
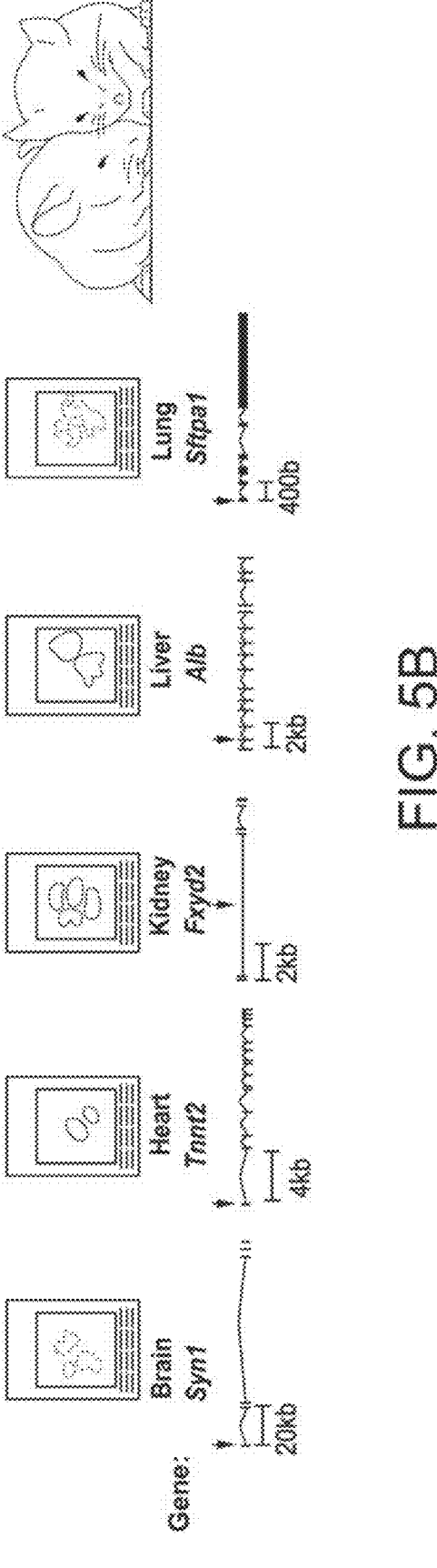
FIG. 5B illustrates various mouse organs in FFPE blocks and associated genes.
Figure 5C:
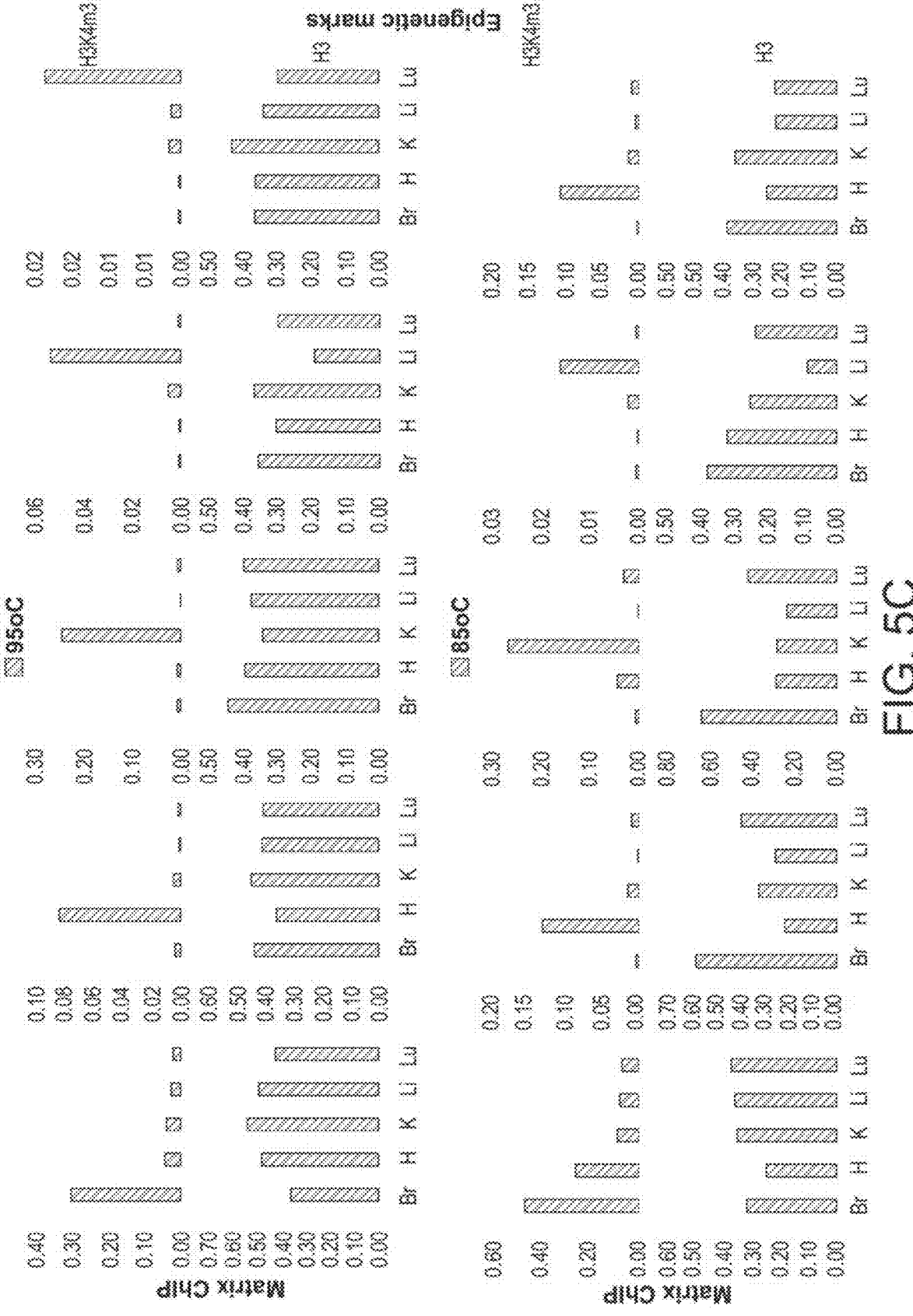
FIG. 5C illustrates an analysis of chromatin extracted from the mouse organs of FIG. 5B.

Referring additionally to FIGS. 5A-5C, in various embodiments, heating of FFPE samples to 95° C. vs. 85° C. may yield better epigenetic results. For example, in various embodiments, epigenetic analysis of FFPE samples was compared at 95° C. vs. 85° C. heat retrieval.

As shown in FIG. 5A, an illustrative FFPE protocol is shown. As shown in FIG. 5B, FFPE blocks of mouse brain (B), heart (H), kidney (K), liver (Li), lung (Lu) and muscle (M) and cartoons of the genes are shown. Black arrows show position of primers used in Matrix-ChIP-qPCR. As shown in FIG. 5C, Heat (95° C. vs. 85° C.)-extracted chromatin was analyzed in Matrix ChIP using antibody to H3K4m3 and histone H3 epigenetic marks. Mouse IgG was used for background subtraction. Inputs were diluted 20× to overcome PCR interference. Results (expressed as a fraction of input) represent mean±SEM (n=2 different FFPE extractions).

It will be appreciated that heat may be entailed in retrieving analytes such as chromatin, DNA, RNA and protein from FFPE samples. Referring additionally to FIGS. 5A-5C, heat retrieval efficiency of chromatin at 95° C. vs. 85° C. from FFPE samples prepared from multiple mouse organs was compared. These illustrative results demonstrated that, at 95° C., there was less noise and more organ-specific signals compared to the heat retrieval done at 85° C. This comparison shows the importance of adjusting the temperature for heat retrieval from FFPE samples (as shown in FIG. 5C).

Figure 6A:
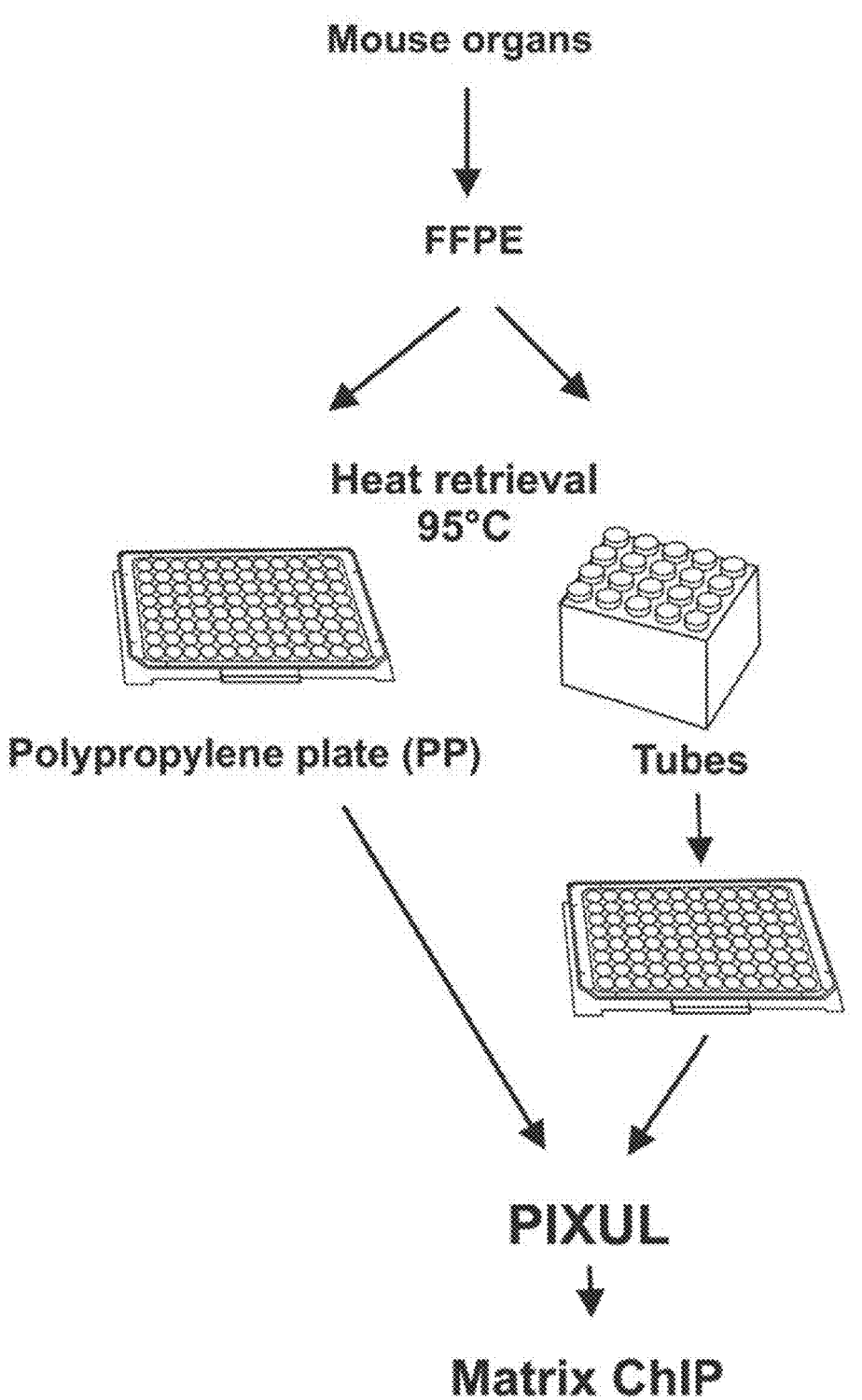
FIG. 6A illustrates an illustrative heat retrieval protocol using either polypropylene plates or test tubes.
Figure 6B:
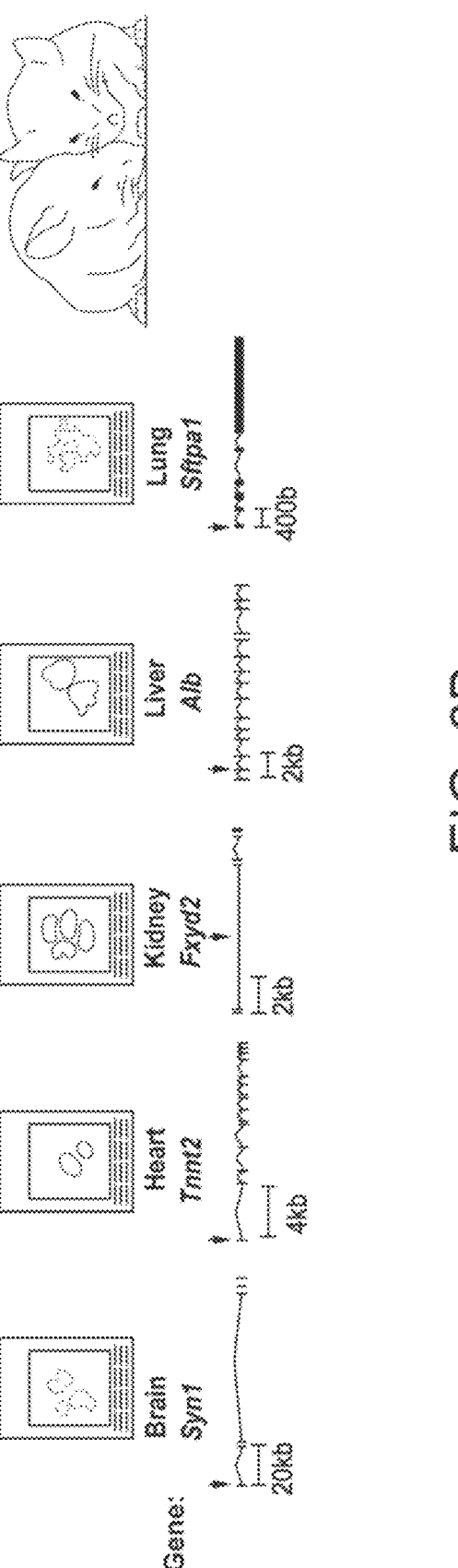
FIG. 6B illustrates FFPE blocks of various mouse organs and associated genes.
Figure 6C:
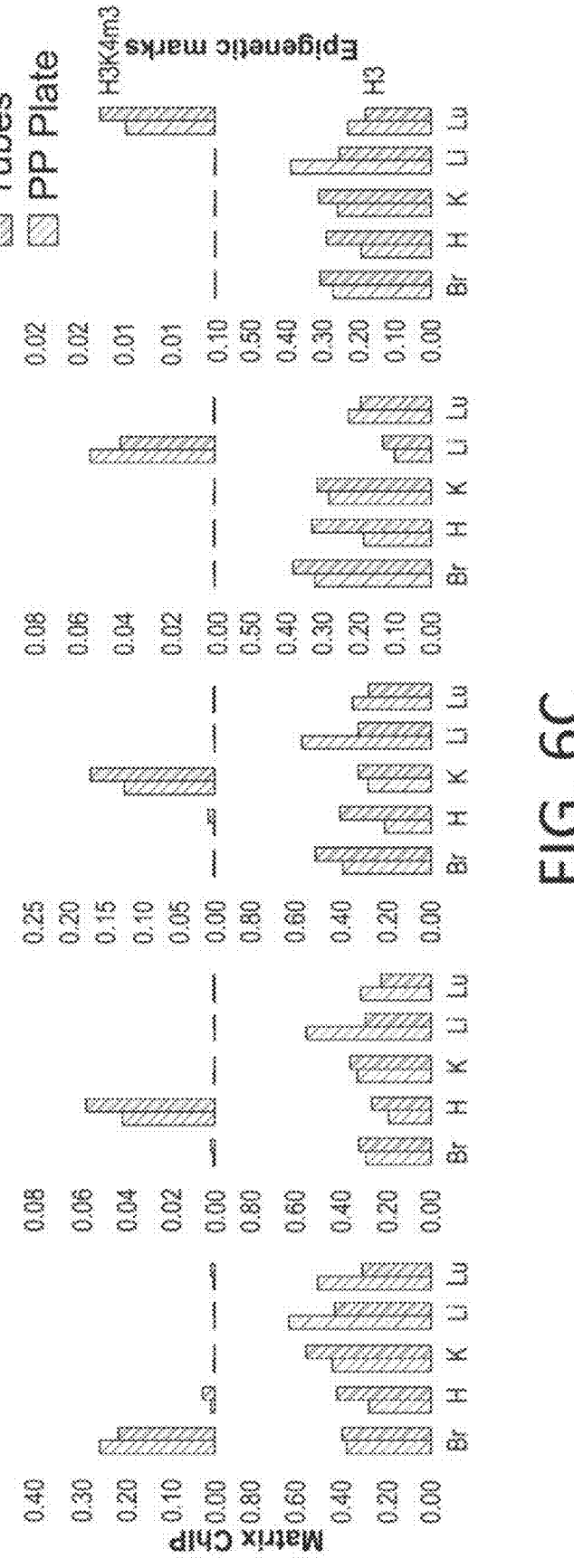
FIG. 6C illustrates an analysis of chromatin extracted from the mouse organs of FIG. 6B.

Referring additionally to FIGS. 6A-6C, in various embodiments, epigenetic analysis of FFPE samples with 95° C. heat retrieval using heat-resistant round-bottom PIXUL 96-well polypropylene (that is, no sample transfer) was compared to test tubes (that is, sample transfer). As is known, traditionally heat retrieval of analytes is done in a slow and tedious process using test tubes requiring sample transfers (for example, Qiagen kits). Using mouse organ FFPEs, heat retrieval using the traditional test tube method was compared with retrieval using modified 96-well round-bottom polypropylene plates.

As shown in FIG. 6A, in various embodiments, an illustrative sonication-FFPE heat retrieval protocol used either a heat-resistant polypropylene plate or tubes. For the test tube method, the samples had to be transferred to a plate for chromatin shearing in the microplate cycling thermo sonicator. In contrast, using the round-bottom plate, chromatin heat retrieval and sonication were done in the same plate without sample transfer.

As shown in FIG. 6B, samples included FFPE blocks of mouse brain (B), heart (H), kidney (K), liver (Li), lung (Lu), and muscle (M). As also shown in FIG. 6B, in representations of the genes, black arrows show position of primers used in Matrix-ChIP-qPCR.

As shown in FIG. 6C, heat-extracted chromatin (with 95° C. heat) in either heat-resistant polypropylene plates or tubes was analyzed in Matrix ChIP using antibody to H3K4m3 and histone H3 epigenetic marks. Mouse IgG was used for background subtraction. Inputs were diluted 20× to overcome PCR interference. Results (expressed as a fraction of input) represent mean±SEM (n=2 different FFPE extractions).

It will be appreciated that, as shown in FIG. 6C, the epigenetic results were the same using the two different methods. Thus, in various embodiments, use of heat-resistant round-bottom polypropylene microplates can help increase the throughput not only in FFPE sample analysis but also in other applications where ultrasound and programmable heating/cooling are used in research and in clinical diagnostic laboratory applications.

From the foregoing, it will be appreciated that specific embodiments of the present subject matter have been described herein for purposes of illustration, but that various modifications may be made without deviating from the spirit and scope of the present subject matter. Accordingly, the present subject matter is not limited except as by the appended claims.

What is claimed is:

1. A sonicator, comprising:
a microplate defining a plurality of wells;
a manifold for containing a temperature-controlled transducer fluid that is thermally coupled to the plurality of wells of the microplate by circulating the temperature-controlled transducer fluid both above and below the microplate;
an ultrasonic generator operable for applying an ultrasonic excitation to the wells of the microplate;
a heating module thermally coupled to and operable for selectively heating the temperature-controlled transducer fluid; and
a controller operable for controlling operation of the ultrasonic generator and the temperature of the circulated, temperature-controlled transducer fluid such that heat may be selectively applied to the temperature-controlled transducer fluid while applying ultrasonic excitation to the wells of the microplate at the same time.

2. The sonicator of claim 1, further comprising a tank operable for holding the temperature-controlled transducer fluid that is circulated to the manifold.

3. The sonicator of claim 1, further comprising a pump assembly operable for circulating the temperature-controlled transducer fluid through the manifold.

4. The sonicator of claim 1, further comprising:
a cooling module thermally coupled to and operable for selectively cooling the temperature-controlled transducer fluid; and
a valve assembly operable for switching the temperature-controlled transducer fluid between the heating module and the cooling module.

5. The sonicator of claim 1, wherein the controller is further operable for monitoring a temperature and a pressure within the manifold.

6. The sonicator of claim 1, wherein a temperature of the plurality of wells is controllable over a temperature range from 4° C. to 95° C.

7. The sonicator of claim 1, wherein the plurality of wells comprise a plurality of heat-resistant round-bottom hydrophilic wells.

8. The sonicator of claim 1, further comprising a cooling module thermally coupled to and operable for selectively cooling the temperature-controlled transducer fluid, wherein the controller is further operable for each of:
selectively cooling the temperature-controlled transducer fluid and applying ultrasonic excitation to the wells of the microplate at the same time; and
selectively applying ultrasonic excitation to the wells of the microplate without heating or cooling the temperature-controlled transducer fluid.

9. A sonicator method, comprising:
providing a microplate defining a plurality of wells;
providing a manifold for containing a temperature-controlled transducer fluid that is thermally coupled to the plurality of wells of the microplate by circulating the temperature-controlled transducer fluid both above and below the microplate;
selectively applying an ultrasonic excitation to the wells of the microplate using an ultrasonic generator;
selectively heating the temperature-controlled transducer fluid using a heating module thermally coupled to the temperature-controlled transducer fluid; and
controlling operation of the ultrasonic generator and the temperature of the circulated, temperature-controlled transducer fluid such that heat may be selectively applied to the temperature-controlled transducer fluid while applying ultrasonic excitation to the wells of the microplate at the same time using a controller.

10. The sonicator method of claim 9, further comprising providing a tank operable for holding the temperature-controlled transducer fluid that is circulated to the manifold.

11. The sonicator method of claim 9, further comprising providing a pump assembly operable for circulating the temperature-controlled transducer fluid through the manifold.

12. The sonicator method of claim 9, further comprising:
providing the heating module thermally coupled to and operable for selectively heating the temperature-controlled transducer fluid;
providing a cooling module thermally coupled to and operable for selectively cooling the temperature-controlled transducer fluid; and
providing a valve assembly operable for switching the temperature-controlled transducer fluid between the heating module and the cooling module.

13. The sonicator method of claim 9, further comprising monitoring a temperature and a pressure within the manifold using the controller.

14. The sonicator method of claim 9, wherein the plurality of wells comprise a plurality of heat-resistant round-bottom hydrophilic wells.

15. The sonicator method of claim 9, further comprising shearing DNA in the plurality of wells.

16. The sonicator method of claim 9, further comprising extracting analyte comprising one or more or RNA, DNA, chromatin, and protein from formalin fixed paraffin embedded (FFPE) samples using heat retrieval in the plurality of wells.

17. The sonicator method of claim 9, further comprising enhancing biochemical or chemical reactions including enzymatic catalysis or antibody-antigen binding in the plurality of wells through application of cycles of controlled heating/cooling and sonication either at the same time or at different times.

\* \* \* \* \*